United States Patent [19]

Rudd et al.

[11] 4,215,259

[45] Jul. 29, 1980

[54] SURFACE HARDENING OF METALS USING ELECTRIC CURRENTS

[75] Inventors: Wallace C. Rudd, New Canaan; Humfrey N. Udall, Darien, both of Conn.

[73] Assignee: Thermatool Corporation, Stamford, Conn.

[21] Appl. No.: 923,776

[22] Filed: Jul. 12, 1978

[51] Int. Cl.[2] .......................... H05B 5/00; H05B 9/00; B23K 9/04; C22F 3/02

[52] U.S. Cl. .................................. 219/10.43; 219/7.5; 219/8.5; 219/76.17; 148/13

[58] Field of Search ............... 219/7.5, 8.5, 9.5, 10.41, 219/10.43, 76.1, 76.11, 76.17, 77; 148/13

[56] References Cited

U.S. PATENT DOCUMENTS

| | | | |
|---|---|---|---|
| 2,164,310 | 7/1939 | Denneen et al. | 219/10.41 X |
| 3,101,400 | 8/1963 | Gagliardi | 219/10.41 X |
| 3,497,662 | 2/1970 | Rudd et al. | 219/104 X |
| 3,591,757 | 7/1971 | Rudd | 219/104 X |
| 4,006,337 | 2/1977 | Maxim | 219/8.5 |
| 4,039,700 | 8/1977 | Sohmer et al. | 219/9.5 X |

OTHER PUBLICATIONS

*Business Week*; Mar. 29, 1976; p. 76J; "When A Laser Liquifies Metal".
*Automotive Industries*; Aug. 1, 1976; pp. 31–33; "The Laser Takes On The Hard Ones" by Carl A Gottesman.
*Physics Today*; Nov. 1976; pp. 44–49; "Processing with Lasers" by Edward M. Breinan, Bernard H. Kear and Conrad M. Banas.
*Heat Treating;* Feb. 1977; pp. 16–21; "Laser Heat Treating" by Lawrence W. Carley.
*Heat Treating;* Apr. 1977; pp. 18–23, "Electron Beam Heat Treating" by Lawrence W. Carley.

*Primary Examiner*—B. A. Reynolds
*Assistant Examiner*—Keith E. George
*Attorney, Agent, or Firm*—Brooks, Haidt, Haffner & Delahunty

[57] ABSTRACT

Method and apparatus for modifying the surface properties of a metal part made of a metal which changes its properties with heating to a transformation temperature and subsequent cooling in which method electric current having a frequency of at least 3000 Hz is supplied to a pair of contacts respectively at the opposite ends of the surface area to be modified through a proximity conductor or conductors which are spaced from the surface area by not more than two times the width of the conductor. The duration, frequency and magnitude of the current and the width of the proximity conductor or conductors are chosen so that the metal of such area heats at least to the transformation temperature before the adjacent metal reaches a temperature which would prevent self-quenching of the area metal, by means of conduction of heat from the area metal to the adjacent metal, when the current is discontinued. Apparatus for producing lines of hardening on valve seats is disclosed.

26 Claims, 25 Drawing Figures

Fig. 6.
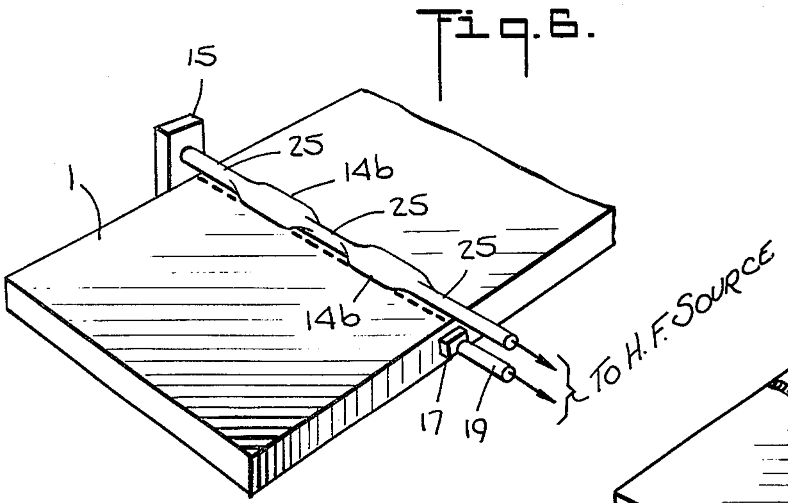
Fig. 7.
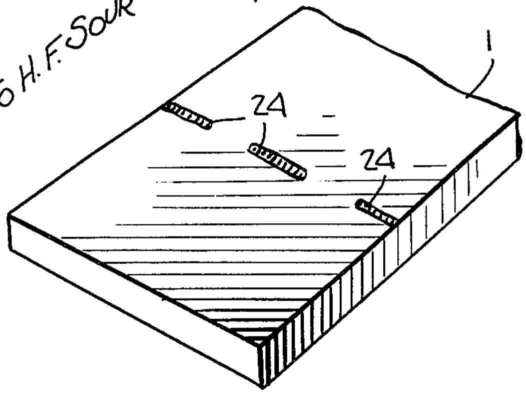
Fig. 8.
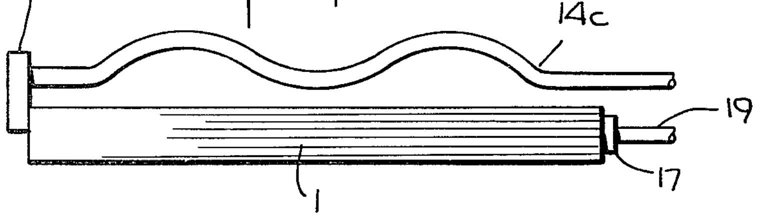
Fig. 11.
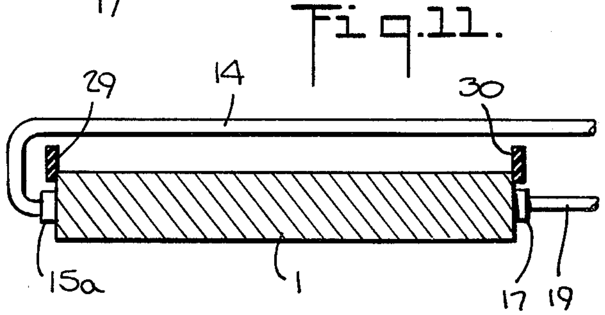
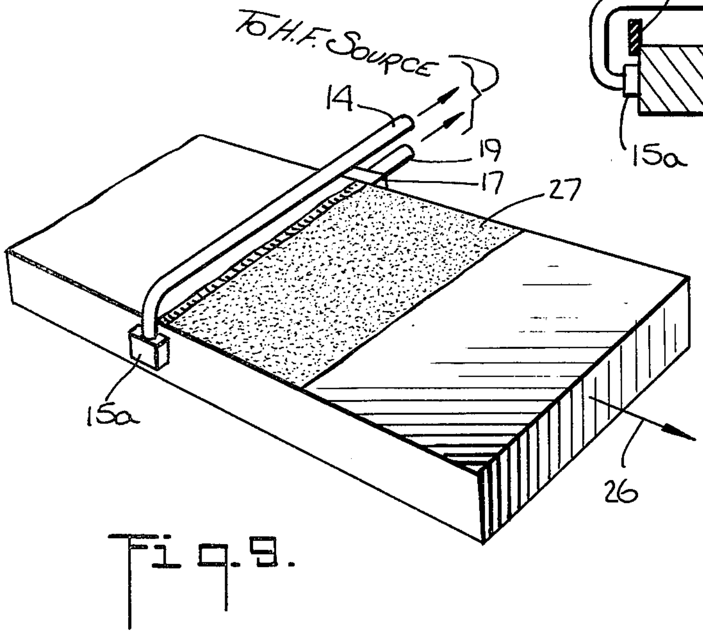
Fig. 9.
Fig. 10.
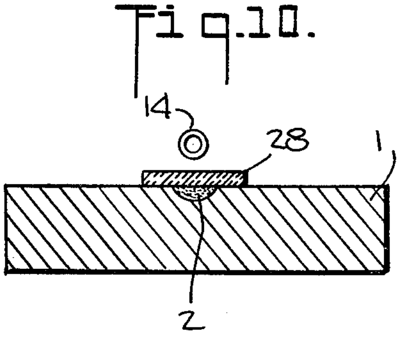

Fig. 12.
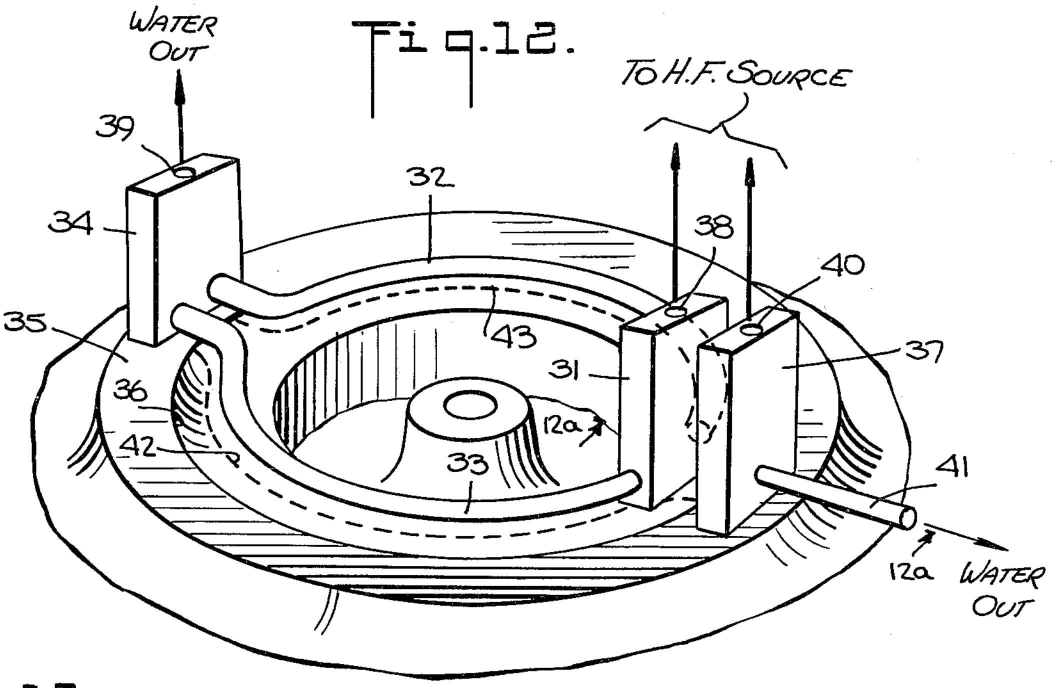
Fig. 13.
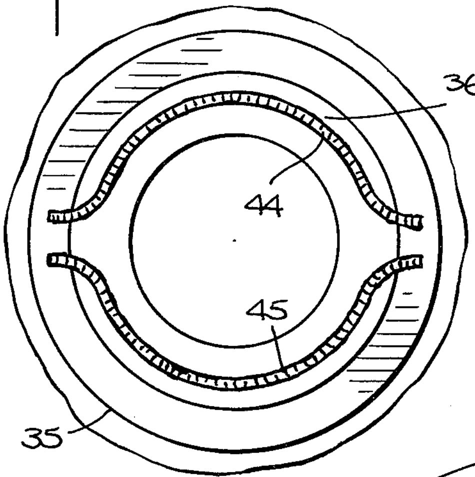
Fig. 12A.
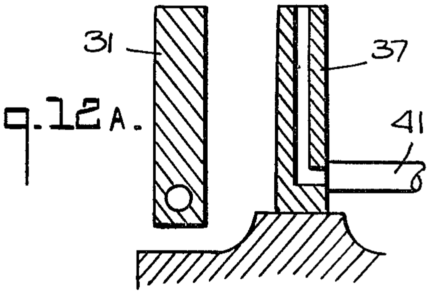
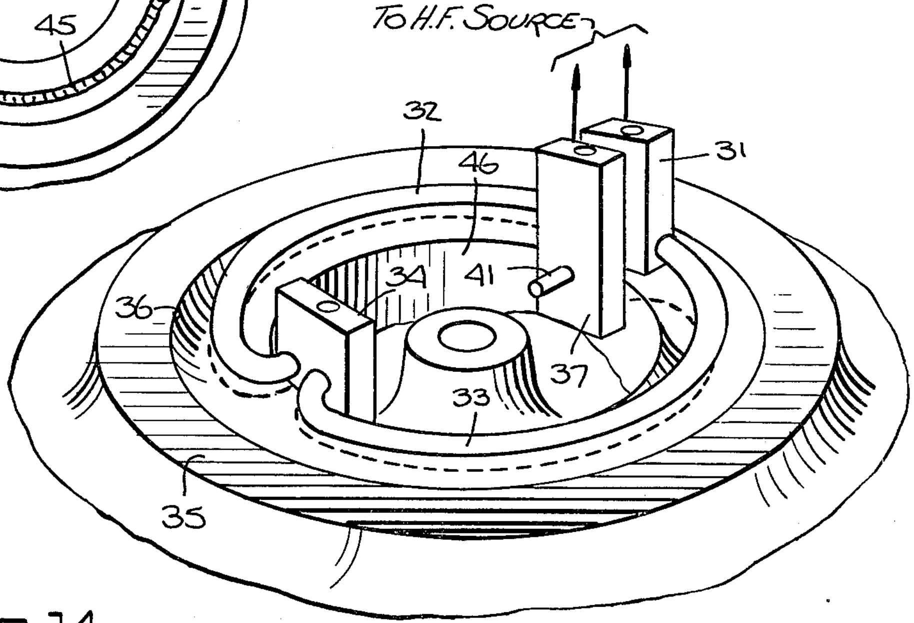
Fig. 14.

Fig. 19.
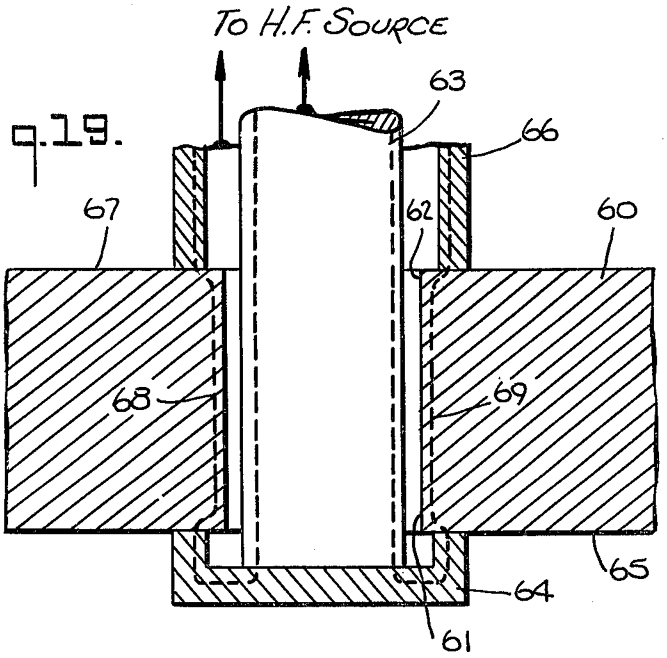
Fig. 20.
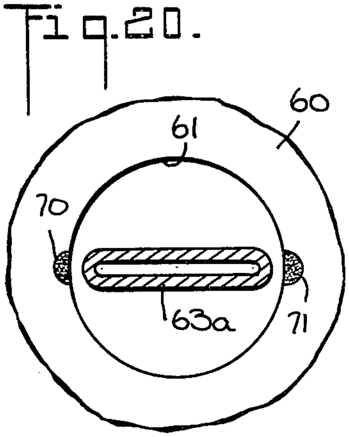
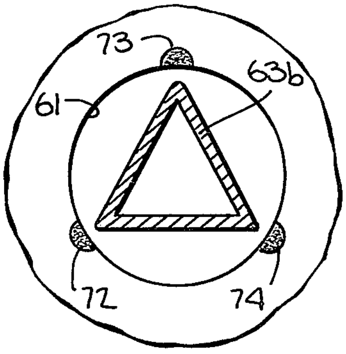
Fig. 21.
Fig. 22.
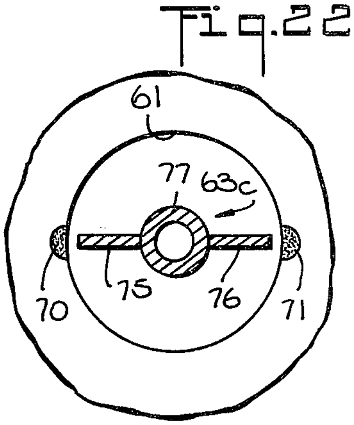
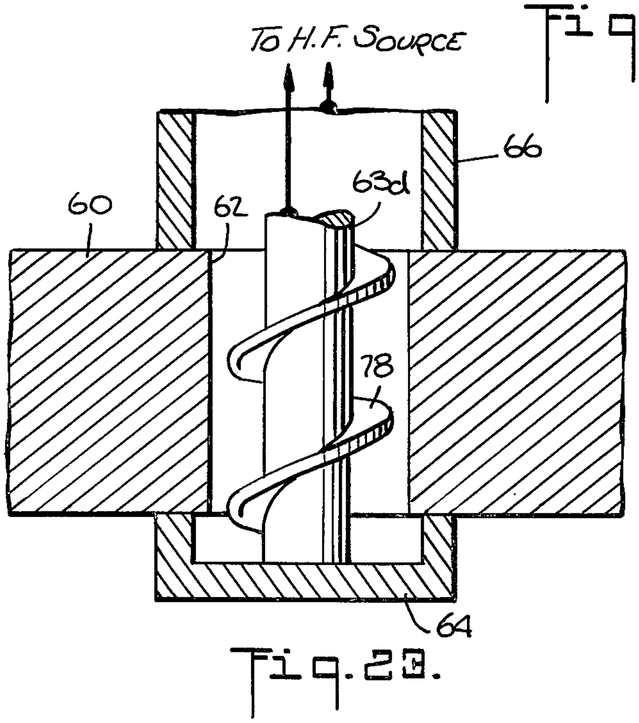
Fig. 23.
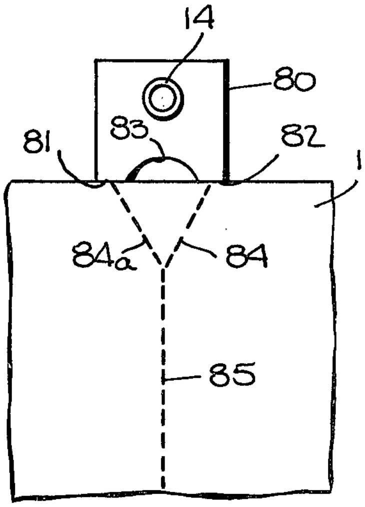
Fig. 24.

SURFACE HARDENING OF METALS USING ELECTRIC CURRENTS

This invention relates to a process and apparatus for modifying the surface properties of metals employing electrical heating of the metal at its surface to raise its temperature to at least its transformation temperature under conditions such that there is subsequent self-quenching of the heated metal.

The modification of the surface properties of metals by heating wih the use of laser or electron beams and self-quenching is known in the art. See, for example, the articles in the publications "Business Week", Mar. 29, 1976, at page 76J; "Automotive Industries", Aug. 1, 1976, beginning at page 31; "Physics Today", November 1976, beginning at page 44; and "Heat Treating", February and April 1977, beginning at pages 16 and 18 respectively. As explained in said articles, the structure of alloys of various metals can be changed, and metal alloys can be formed, by rapid, localized and intense heating followed by rapid cooling by reason the conduction of heat to the adjacent, cooler metal. Additional cooling, e.g., by water, oil or air, may also be employed if desired. Thus, by such localized heating of metals to its transformation temperature and rapid cooling, and without the addition of another material or applying a cooling medium thereto, the hardness of the heated area may be increased, alloys may be modified in composition, glassy or amorphous metal can be formed, the crystalline structure can be changed, etc.

The operating efficiency of laser beam apparatus used for such purposes is relatively low, e.g., of the order of 7–10%, and the cost thereof is relatively high. In addition, high average power laser beam apparatus is not available even though high peak power pulses, with low average power, are produced. Furthermore, to produce the power, e.g., 100,000 $Kw/cm^2$, and heat concentration required, the beam is very small in cross section which means relatively slow processing rates for larger areas. Also, the beam strikes the surface from which the heat must spread by conduction, and the surface must be clean and be a good laser energy absorbing surface. Because the beam strikes the surface, the surface may melt before adjacent areas are heated to the desired temperature.

Similar problems arise in connection with electron beam apparatus, i.e., the average power is low, the beam is small in cross section, the heat must spread by conduction and the surface must be clean. In addition, the metal to be heated must usually be maintained in a vacuum during the heating which creates delay in processing and requires vacuum apparatus.

It has also been suggested that electrical induction heating be used in conventional case hardening but that the quenching be accomplished in the same manner that it is accomplished in the described laser or electron beam processes rather than by liquid quenching. See, for example, "Heat Treating", March 1977, page 19. While the use of induction heating overcomes some of the problems of the laser and electron beam processes, induction heating requires the use of an induction coil with the accompanying coupling difficulties, and an inherent problem with induction heating is the fact that the induced current must flow in closed paths which means that unless the closed paths conform to the area of the metal to be heated, there is undesired current flow and heating in the metal and a waste of power.

It is known in the art that high concentrations of electric current in a metal part can be produced by contacting the metal part with a pair of contacts, one at one end of the desired path and one at the other end of such path, and connecting the contacts to a high frequency current source, at least one of the contacts being connected to the source through a conductor, known as a proximity conductor, which extends from adjacent one contact to the other contact and which is closely adjacent to and follows the desired current path. See, for example, U.S. Pat. Nos. 2,857,503, 3,591,757 and 3,860,778. In the methods of such patents, the heating is relatively slow as compared to the method of the present invention and self-quenching of the metal is not contemplated. It is also known to use such method and apparatus to heat metal to its transformation temperature and to quench such metal by oil, water or brine, the configuration of the metal and the heating rate being such that self-quenching would not occur. However, as far as we are aware, such apparatus has never been used, or suggested for use, in the special types of metal treatment described in the articles identified hereinbefore in which the heated metal is self-quenched.

One object of the invention is to provide a method for modifying the surface structure of a metal which can have its physical characteristics changed with the application of heat and using self-quenching techniques which method does not have the disadvantages of the prior art methods described hereinbefore.

In accordance with the one embodiment of the invention, power densities of at least 20 kilowatts per square centimeter and higher are produced along a path in a metal part made of a metal which can be structurally modified by heating it to a transformation temperature and rapid cooling, by supplying electric current to such path by means of contacts, one at each end of the path, by suitably selecting the current frequency and magnitude so that a large current effectively penetrates the metal only a very small amount and by feeding the current to at least one of the contacts through proximity conductor means properly located and of the proper size. The conditions are selected so that the heating to a high temperature occurs only in a narrow area of small depth and so that the metal adjacent to the area remains cool enough to cause self-quenching of the metal in such area after the current is discontinued. However, if desired, such self-quenching may also be assisted by the use of a cooling medium applied at least immediately after the current is discontinued.

Other objects and advantages of the present invention will be apparent from the following detailed description of the presently preferred embodiments thereof, which description should be considered in conjunction with the accompanying drawings in which:

FIG. 6 is similar to FIG. 4, but illustrates a proximity conductor of varying cross-section for producing a series of aligned hardened lines of metal on the surface of a metal part;

FIG. 7 illustrates the hardened lines of metal obtained with the apparatus shown in FIG. 6;

FIG. 8 is a side elevation view of a proximity conductor which has a varying spacing with respect to a metal part for producing results similar to those shown in FIG. 7;

FIG. 9 is similar to FIG. 4, but illustrates the hardening of wider area of the surface of a metal part;

FIG. 10 is a cross-sectional, and elevation view illustrating the use of a plate or bar to confine the metal being heated when it is heated to melting temperature;

FIG. 11 is a cross-sectional, side elevation view illustrating the use of plates or bars at the ends of a line of metal being heated to prevent loss of metal;

FIG. 12 is a perspective view illustrating the hardening of a valve seat;

Figure 15:
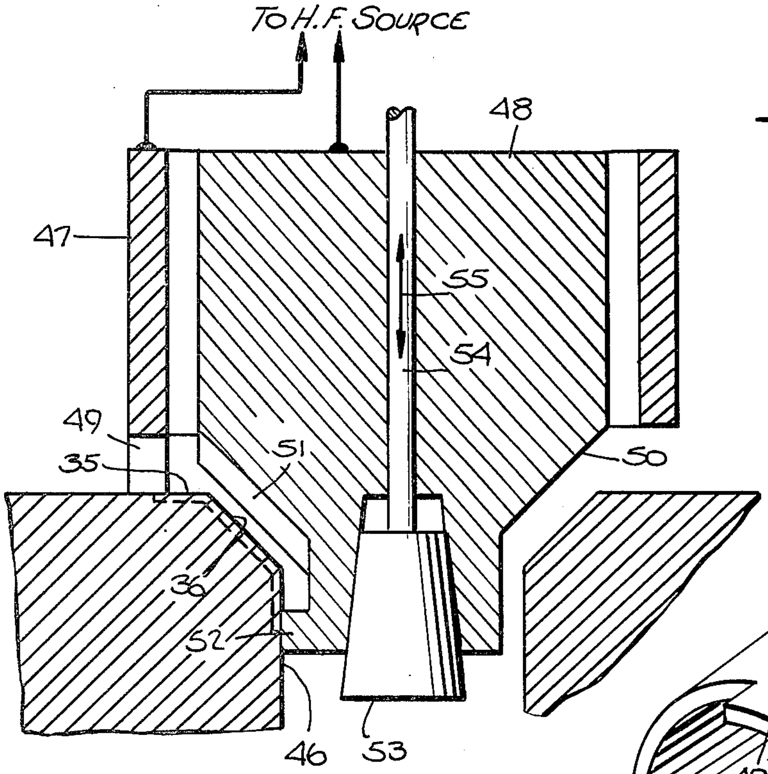
Figure 17:
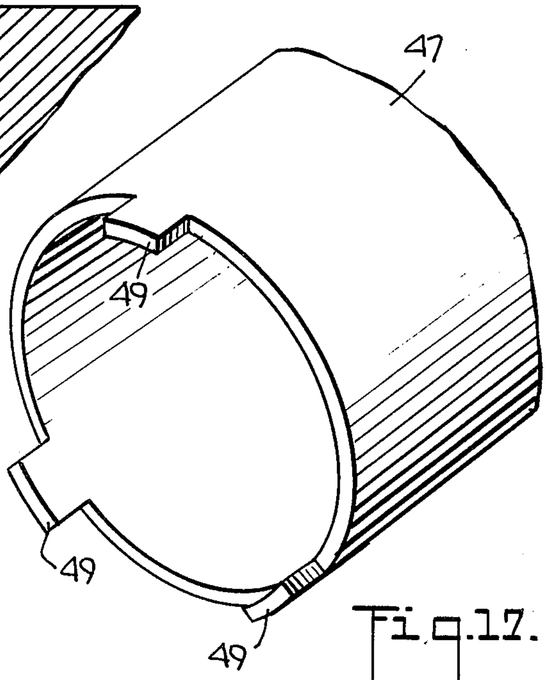
Figure 16:
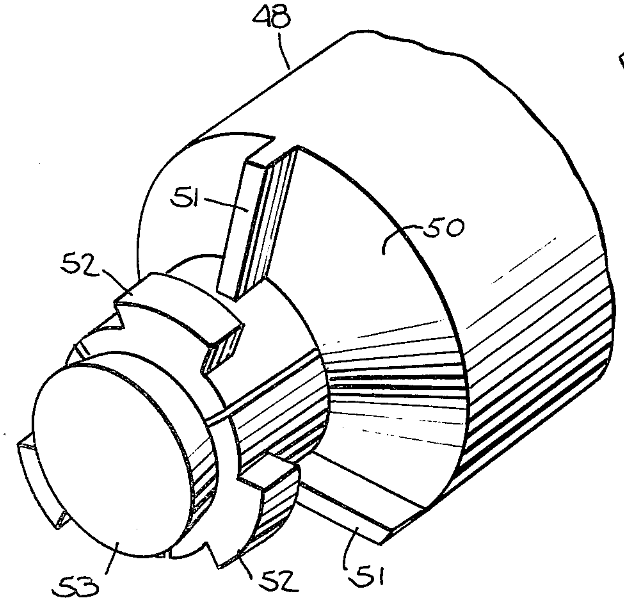
Figure 18:
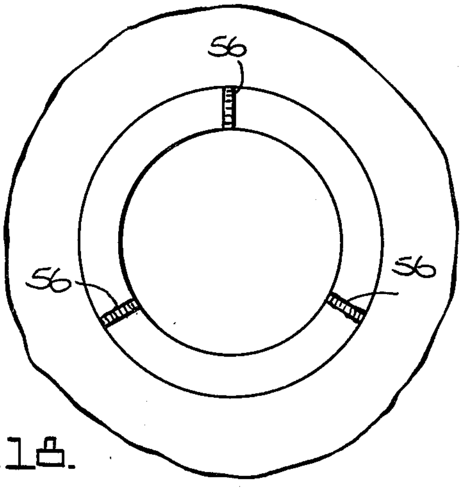

FIG. 12*a* is a partial cross-section of the embodiment shown in FIG. 12 and is taken along the line 12*a*–12*a* indicated in FIG. 12;

FIG. 13 is a plan view of the embodiment shown in FIG. 12 with the heating apparatus removed;

FIG. 14 is similar to FIG. 12, but shows modified heating apparatus;

FIG. 15 is a cross-sectional, side elevation view of modified heating apparatus for hardening a valve seat;

FIGS. 16 and 17 are perspective views of portions of the heating apparatus shown in FIG. 15;

FIG. 18 is a plan view illustrating the hardened lines of metal obtained with the apparatus shown in FIG. 15;

FIG. 19 is a side elevation view, partly in cross-section, illustrating heating apparatus for hardening the wall of a hole;

FIGS. 20–22 are plan views, partly in cross-section, illustrating modified forms of proximity conductors for use in the embodiment shown in FIG. 19

FIG. 23 is similar to FIG. 19 but illustrates a proximity conductor for producing a helical line of hardened metal; and FIG. 24 is a plan view of a modified form of contact which may be used to prevent melting or overheating of metal immediately adjacent the current supplying contacts.

For a better understanding of the invention, it is desirable to call attention to certain phenomena associated with metal heating by electric currents. Thus, the heat developed is proportional to the square of the current times the effective resistance of the path through which the current flows. The effective path of the current depends upon the skin effect, i.e., the increased current density at the surface of the part, the proximity effect, i.e., the tendency of the current in the part to flow as near as possible to a conductor, e.g., a proximity conductor, carrying oppositely flowing current, and the reference depth, i.e., the equivalent depth assuming (even though it is not the case) a uniform current distribution to such depth, which is defined by the formula:

$$d \text{ in inches} = 3160\sqrt{p/uf}$$

where p is the resistivity of the metal in ohm inches, u is the relative magentic permeability and f is the frequency in cycles per second. It will be noted that reference depth decreases with increases in frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The reference depth of current in a metal is determined from the formula set forth hereinbefore, and is sometimes referred to as the depth in which 86% of the heat is developed and within which about 86% of the current flows. Typical reference depths, in inches, in various metals at 70° F., are as follows:

| | Frequency — Kilohertz | | | | |
|---|---|---|---|---|---|
| Material | 0.06 | 3 | 10 | 100 | 400 |
| Steel* | 0.041 | 0.0066 | 0.0002 | 0.00059 | 0.0003 |
| Aluminum | 0.430 | 0.110 | 0.033 | 0.010 | 0.005 |
| Brass | 0.640 | 0.150 | 0.050 | 0.016 | 0.008 |
| Copper | 0.336 | 0.085 | 0.026 | 0.008 | 0.005 |

*Below Curie Point; for non-magnetic steel or magnetic steel above Curie Point multiply by 100 for approximate value.

Proximity effect is also dependent both on current frequency and the spacing between the paths carrying oppositely flowing currents. At current frequencies below about 3000 hertz, proximity effect is relatively small, but proximity effect becomes significant at 3000 hertz or higher and becomes increasingly important at 50 kilohertz and higher. At spacings between the centers of round conductors of the order of five or more times the conductor diameters, the effect is relatively small, but with spacings less than about twice the diameters, the effect is significant, and the width of the major current path more closely approaches the width of the proximity conductor. Similar effects are present with conductors of other shapes. Thus, in order to be effective for the purposes of the invention, the heating current frequency must be at least 3000 hertz and preferably, is at least 50 kilohertz, and the spacing between the proximity conductor and the faces of the metal portion to be heated should be not greater than two times the width of the proximity conductor and preferably is about one-half the width thereof.

The width of current path in the part is also influenced by the use of magnetic pieces at the sides of the current path and by the shape and spacing of the proximity conductor carrying oppositely flowing current, the latter being illustrated in FIGS. 7–10 and described in the copending application of Rudd, Ser. No. 901,360, filed May 1, 1978, and entitled "High Frequency Induction Welding with Return Current Paths on Surfaces to be Heated" (TW-127). Thus, by increasing the spacing between the proximity conductor and the metal to be heated, the width of the current path is increased, and by increasing the width of the proximity conductor in a direction parallel to the width of the current path, the width of the current path is increased.

At high frequencies, the path of the major portion of the current is determined mainly by the reactance of the path rather than by the resistance thereof, and therefore, the major portion of the current may not follow the shortest path between two points of different potential. Since the proximity conductor decreases the reactance of the current path thereadjacent, the principal current path may be made to be a path adjacent the proximity conductor even if such path is not the physically shortest path.

Of course, heat is transferred to the portions of the part outside the path of current by conduction flow at a rate dependent upon the thermal conductivity of the metal, but by rapidly heating the metal in the major current path to a high temperature and then discontinuing the current flow, the temperature of such portions may be kept low as compared to that of the current carrying metal.

For all these reasons, the path of the current flow and its effective dimensions, the heating and temperature obtained and the localization of the heating are dependent upon many factors including the presence or absence of a proximity conductor, the shape and location of the proximity conductor with respect to the part to be heated, the time duration of current flow, the electrical and thermal characteristics of the metal, the configuration of the part being heated, the presence or absence of magnetic material adjacent the current path, etc. In accordance with the invention, use is made of such phenemena to provide a restricted and rapid heating of the metal to be treated and to heat a portion of such part to the desired temperature without raising the temperature of the metal spaced a short distance from such portion, either to the side or below thereof, to a temperature which would prevent self-quenching.

Figure 1:
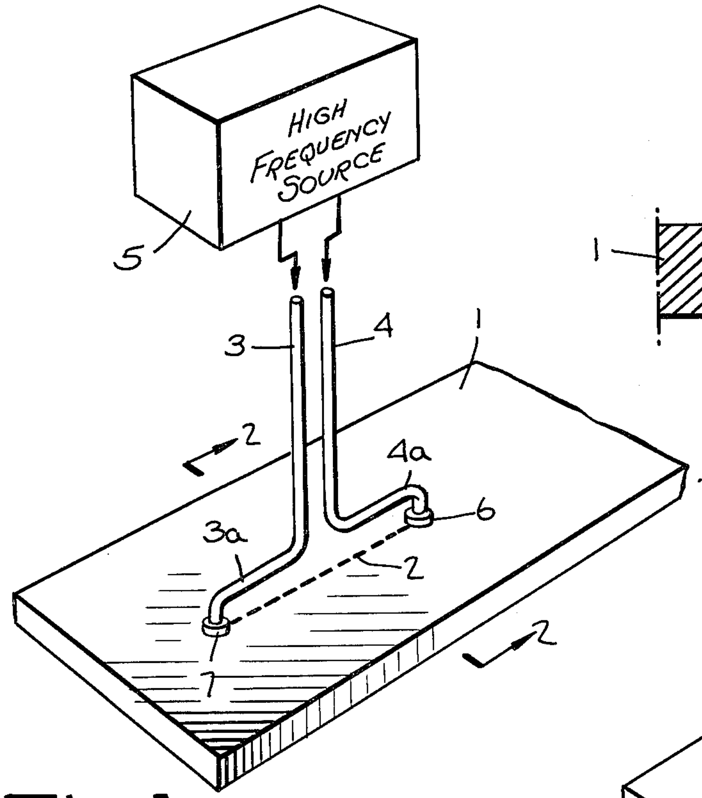
FIG. 1 is a schematic, perspective view of apparatus for heating a metal part along a line.
Figure 2:
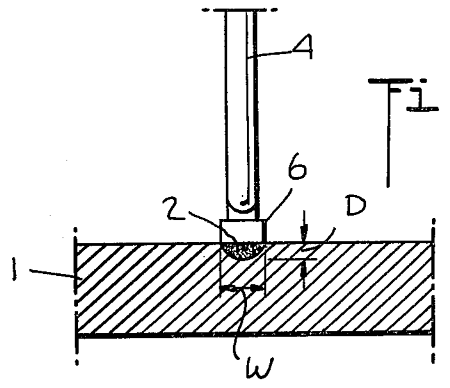
FIG. 2 is a cross-sectional view of the embodiment shown in FIG. 1 and is taken along the line 2—2 indicated in FIG. 1.

The basic principles of the invention are illustrated in FIGS. 1 and 2. Such Figures show a metal part 1 which is to be heated along the path indicated by the dotted line 2 for the purpose of hardening the surface thereof along such path. High frequency current is caused to flow along the path 2 by means of a pair of conductors 3 and 4 connected at one end to a source 5 of high frequency current and connected at their opposite ends respectively to the opposite ends of the path 2 through a pair of contacts 6 and 7.

The leads 3 and 4 have a pair of horizontal portions *3a* and *4a* which extend substantially parallel, and in closely spaced relation, to the upper surface of the metal part 1 and together overlie substantially the full length of the part 2. It will be noted that the currents in the portions *3a* and *4a* are flowing oppositely to the current in the adjacent path 2 at any given instant of time, and therefore, the portions *3a* and *4a* act as proximity conductor means for concentrating the current at the path 2. The path 2 is the physically shortest path between the contacts 6 and 7, and while most of the current would flow along the path 2 in the absence of the portions *3a* and *4a*, the width of the current path 2 would be greater in the direction parallel to the upper surface of the part 1 and perpendicular to a line between the contacts 6 and 7.

In FIG. 2, the cross-section of the path 2 is indicated by the shaded area, and the depth D is the reference depth or the depth within which about 86% of the current flows and about 86% of the heat is developed. Thus, by suitably selecting the frequency of the current in relation to the metal of the part 1, the depth of the rapidly heated metal can be controlled.

As mentioned hereinbefore, the width W of the cross-section of the path 2 can be controlled by the spacing of the portions *3a* and *4a* with respect to the upper surface of the part 1, and the width and shape of the portions *3a* and *4a*. Thus, by keeping the spacing between the portions *3a* and *4a* and the upper surface of the part 1 no greater than two times the cross-sectional width of the portions *3a* and *4a*, there is significant proximity effect, and the less the spacing, the smaller the width W will be. Similarly, by keeping the cross-sectional width of the portions *3a* and *4a* small, consistent with the current carrying and heat dissipation requirements, the width W is kept small, the narrower the width of the portions *3a* and *4a*, the smaller the width W. The portions *3a* and *4a* may, for example, be copper tubing of 3/16 or ⅛ inch outside diameter which is internally water cooled, the water being under high pressure.

Accordingly, by selecting the duration, magnitude and frequency of the heating current and the width of the portions *3a* and *4a* (proximity conductors) and their spacing with respect to the upper surface of the part 1, rapid heating of a very narrow and shallow volume of metal along the path 2 can be accomplished while keeping the adjacent metal cool enough to provide self-quenching. It is practical to obtain a heating power density in the path 2 of 20 $Kw/cm^2$ and higher and to heat metal along paths of various lengths to transformation temperature in less than 0.5 seconds, examples of the path width and depth being, respectively, 0.080 inches or less and 0.020 inches or less, and the metal hardening along the path by self-quenching. Similarly, metal along paths of similar width and depth dimensions can be brought to melting temperature and rapidly cooled by self-quenching without melting metal outside such paths and without heating the latter metal to a temperature which will prevent self-quenching. Of course, if desired, the paths can be made wider and deeper using the principles discussed hereinbefore, i.e. selection of frequency, and proximity conductor size and spacing, and selection of the time of current flow and current magnitude, but care must be taken to concentrate the current and to select its duration so that the metal does not melt through to the opposite surface of the part and so that a large area is not heated by conduction of the heat through the metal adjoining the current path.

Figure 3:
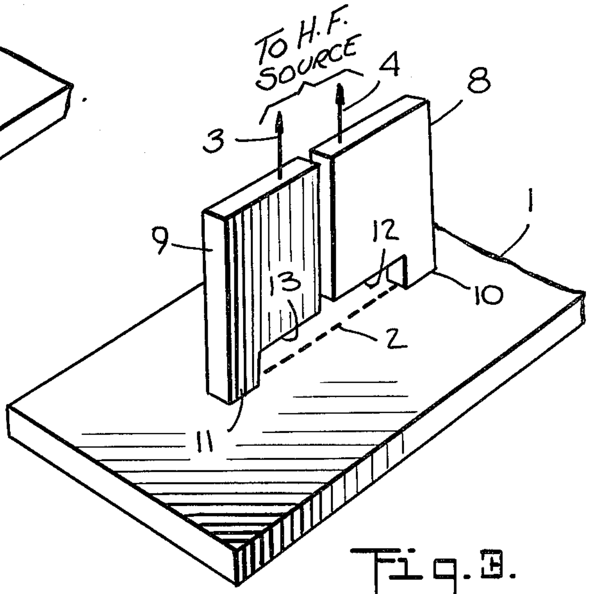
FIG. 3 is similar to FIG. 1, but illustrates a modified form of apparatus.

An alternative form of the embodiment shown in FIGS. 1 and 2 is illustrated in FIG. 3. The embodiment illustrated in FIG. 3 operates in the same manner as the embodiment shown in FIGS. 1 and 2, but the functions of the portions *3a* and *4a* and the contacts 6 and 7, shown in FIG. 1, are performed by a pair of shaped metal blocks 8 and 9, e.g., made of copper, connected by suitable leads to the high frequency source and water cooled in any conventional way.

Thus, the blocks 8 and 9 have portions 10 and 11 which conductively contact the upper surface of the part 1 and have portions 12 and 13 which act as proximity conductors, the current being concentrated at the adjacent faces of the blocks 8 and 9 due to the proximity effect. The portions 12 and 13, like the portions *3a* and *4a* together, overlie substantially the full length of the path 2 and cause the current in the part 1 to be concentrated in a narrow path 2 at the upper surface of the part 1.

If the part 1 is to be hardened along the path 2, the metal of the part 1 should be a metal which can be hardened by heating followed by self-quenching. Carbon steels, such as A.I.S.I. C1040, C1060, C1090, etc. are representative of such metals but other hardenable metals may also be used for the part 1. An advantage of the method of the invention when used with carbon containing metals is that the rate of heating is so high that little carbon is lost as compared with slow speed heating methods. Accordingly, there is very little, if any, decarburization and loss of physical characteristics.

To perform hardening, the desired width, depth, and length of the path 2 are determined and then, the frequency of the current is selected to provide a reference depth equal to the path depth. The contacts 6 and 7, or the contact portions 10 and 11 may be relatively small, e.g. ¼ to ½ inch in diameter or on a side, and the proximity conductors, 3*a* and 4*a* or 12 and 13, are made with a size, shape and length and a spacing with respect to the surface of the part 1 to provide the desired width and length of the path 2, bearing in mind that the proximity conductors must carry hundreds of amperes. The spacing between the proximity conductors and the surface of the part 1 may be relatively small because the voltage therebetween is relatively small and preferably, the spacing is about one-half the proximity conductor width, or less. The high frequency current is then supplied to the contacts through the proximity conductors, and the magnitude and duration thereof required to provide the desired heating in the desired path 2 is determined by test. Generally speaking, the duration of the current flow will be relatively short, e.g. less than one second, in order to avoid significant heating of metal outside the desired path due to thermal conduction. As is known in the metal hardening art, the metal to be hardened is heated to a temperature at or above the critical or transformation range for the metal and then rapidly cooled.

In general, for the hardening of a metal, the metal in the path 2 is not heated to its melting temperature, but as indicated in said article on page 76 of "Business Week" for Mar. 29, 1976, certain metals can be transformed to "glassy metals" by melting them and then, self-quenching them rapidly. The principles of the invention are equally applicable to the production of glassy metal, the surface area of the metal to be transformed being heated to its melting temperature using the principles of the invention.

Due to the current distribution in the path 2, the current being the highest at the surface and decreasing rapidly as the depth increases, the surface temperature will rise faster than the temperature of the metal below the surface. In addition, when the current first flows in a magnetic material, such as hardenable steel, the reference depth is small, whereas when the temperature rises above the Curie-point, such as at temperatures in excess of 1550° F., the reference depth may increase by about 100 times. Accordingly, the effective resistance, and the heating current depth, varies as heating ensues. To prevent surface melting before the metal below the surface reaches the hardening temperature or to vary the depth of heating and hence, hardening, it may be desirable to vary the magnitude of the current in the path 2 during the heating cycle.

For example, it may be desirable to have a large magnitude current at the beginning of the heating cycle and then, to reduce the current before the surface metal reaches its melting temperature thereby permitting the metal below the surface to reach the hardening temperature by thermal conduction and current heating before the surface metal melts.

Similarly, the depth of heating to hardening temperature may be made greater, and may be greater than the reference depth, by increasing the length of the heating cycle and varying the current magnitude to produce temperature distribution. Thus, the current magnitude may be largest at the beginning or the end of the heating cycle or be varied in other manners to produce the desired temperature distribution in the path 2 bearing in mind, however, that for self-quenching, the heating must be very rapid in order that the quenching will be rapid.

Figure 4:
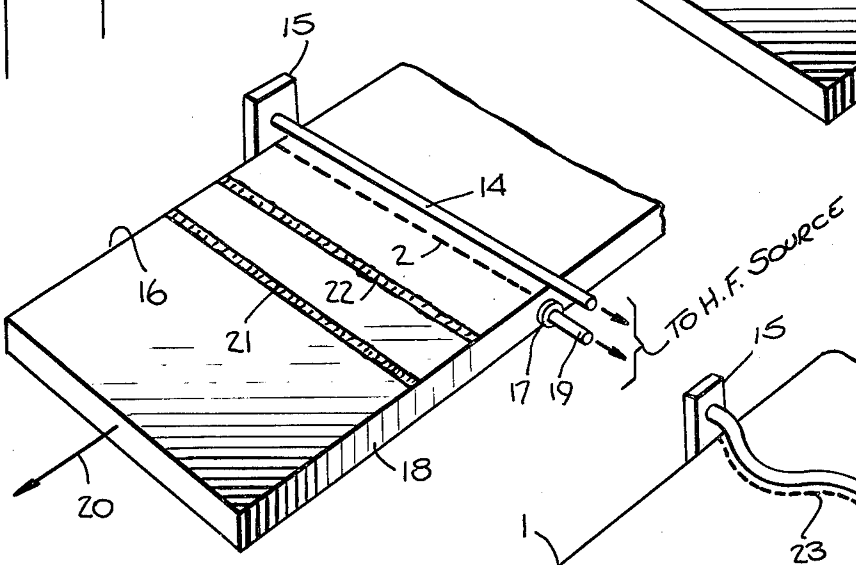
FIG. 4 is a schematic, perspective view illustrating a further modified form of apparatus and the heating and hardening of a plurality of lines of metal on the surface of a metal part.

FIG. 4 illustrates the use of the invention to produce a line, or lines of hardened metal or of melted and then cooled metal on the surface of a metal part 1. In FIG. 4, a proximity conductor 14 overlies the full length of the path 2 where the metal is to be hardened or melted and is connected at its end to a contact 15 which engages a side 16 of the part 1. Another contact 17 engages the opposite side 18 of the part 1 and is connected to the high frequency current source by a lead 19. The spacing between the conductor 14 and the upper surface of the part 1 may, for example, be from 1/16 to 3/16 inches. When current is supplied to the part 1 by way of the proximity conductor 14, the lead 19 and the contacts 15 and 17, metal along the path 2 is heated to a temperature dependent upon the current magnitude and the duration of the current.

After each hardened or melted and cooled line of metal is produced, the part 1 may be moved with respect to the contacts 15 and 17 in the direction of the arrow 20 to produce a series of spaced lines of treated metal on the surface of the part 1, shaded areas 21 and 22 in FIG. 4 representing lines of previously treated metal.

Tests have been conducted with a 1090 carbon steel part 1 having a hardness of Rockwell C 28 using the arrangement shown in FIG. 4. The part was 5/32 inch thick and the conditions and the results in one test were as follows:

Proximity conductor 14—⅛×¾ inch copper bar
Spacing between 14 and surface of part 1—Approximately 1/16 inch
High frequency input—20 Kilowatts at 400 Khz
Duration of current—0.15 seconds
Length of line (path 2)—1.725 inch
Width of hardened line—0.050 inch
Depth of hardened line—0.015 inch
Maximum hardness along line—Rockwell C 66
Hardness at edges of line—Rockwell C 50

In another test with the same proximity conductor 14 and spacing, the same part 1 and the same high frequency input, but with a current duration of 0.2 seconds, the results were as follows:

Length of line (path 2)—1.725 inch
Width of hardened line—0.080 inch
Depth of hardened line—0.020 inch
Maximum hardness along line—Rockwell C 71

In each test, the hardness throughout the line of treated metal was greater than Rockwell C 50, and it will be observed that the depth of the hardened metal was about one-half the reference depth in the metal (approximately 0.30 inches above the Curie-point).

Figure 5:
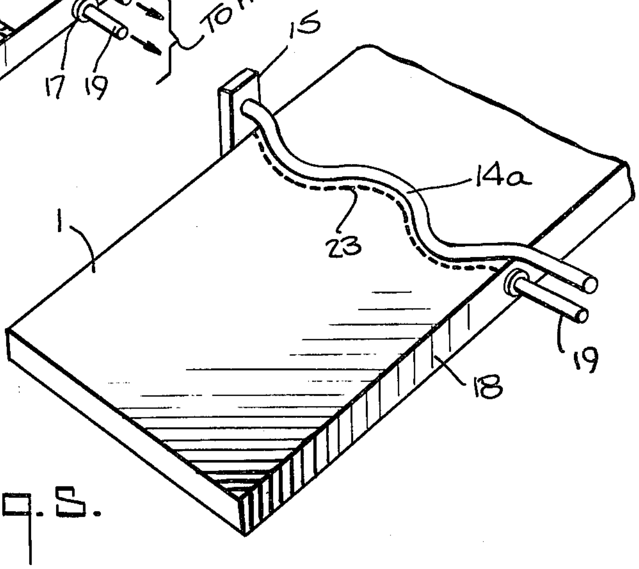
FIG. 5 is similar to FIG. 4, but illustrates a sinuous proximity conductor.

Because of the use of the proximity conductor, the line of hardening or melting need not be straight or continuous. For example, to produce a wavy line 23 the proximity conductor may be shaped in the form of the proximity conductor 14*a* shown in FIG. 5. Because of the proximity effect, the current will concentrate below the proximity conductor 14*a*, and its path will conform to the shape of the conductor 14*a*.

Similarly, by varying the width of the proximity conductor or its spacing with respect to the surface of the part 1, the current concentration, and the heating, below the proximity conductor may be varied to produce spaced hardened or melted metal areas. FIG. 6 illustrates a proximity conductor 14*b* of varying width, and FIG. 7 shows the hardened or melted metal pattern segments 24, the hardening or melting occurring below the narrower width portions 25 of the conductor **14*b*** because of the greater current concentration.

Segments of hardened or melted metal similar to the pattern segments 24 shown in FIG. 7 can also be obtained with the proximity conductor **14*c* shown in FIG. 8 which has a variable spacing with respect to part 1, the current being more highly concentrated below the portions of the conductor 14*c* nearer the surface of the metal part 1**.

An alternative method for producing the pattern illustrated in FIG. 7 is to use the apparatus illustrated in FIG. 4 but to provide areas of metal having an electrical conductivity significantly higher than the electrical conductivity of the metal of the part 1 where hardening or melting is not desired. For example, if the metal of part 1 is steel, a line of copper plating may be provided where the current path 2 is to be and portions thereof corresponding to the segments 24 are removed prior to applying current to the part 1 along the path 2. In this way, because of the lower losses in the copper, the heating intermediate the segments 24 will be less. Of course, instead of applying a continuous line of copper and then removing the portions thereof corresponding to the segments 24, the copper may be applied to the part 1 by known techniques only where less heating is desired.

If it is desired to produce a substantially continuous area of hardened or melted metal which is wider than the path 2 or the lines 21 and 22 (FIG. 4), the part 1 may be moved continuously or stepwise in small increments in a direction parallel to the surface of the part 1 being treated and perpendicular to the length of the path 2 as illustrated in FIG. 9. As illustrated in FIG. 9, the part 1 may be moved in the direction of the arrow 26 to produce a relatively large area 27 of melted and then cooled, or heated to the critical temperature range and then cooled, metal at the upper surface of the part 1. If the area 27 is to be melted and then cooled metal, the current may be applied continuously and the part 1 may be moved continuously in the direction of the arrow 26. However, if the metal of the area 27 is to be hardened, self-quenched metal, it may be preferable to maintain the part 1 stationary while the current flows, to discontinue the current and move the part 1 a small distance in the direction of the arrow 26, again apply the current with the part 1 stationary, etc. Alternatively, the part 1 may be moved continuously and the current may be turned on and off when the metal to be hardened is therebelow or in some cases, the current may be supplied continously with step-wise movement of the part 1.

Because the magnitude of the currents used in the method of the invention, the metal being treated is subjected to relatively large magnetic fields tending to displace the metal being heated. Such effect is unimportant if the metal is not being melted, but if the metal is being melted, the magnetic fields may be of sufficient magnitude to "blow" the molten metal away from its normal position. To avoid such removal of the molten metal, the area being heated may be covered by a bar or slab 28 of a high temperature resistant, insulating material, such as silicon nitride, as illustrated in FIG. 10.

Similarly, if the line or area of metal being melted extends from one side to the other side of the part 1 so that molten metal can drip or distort at the ends of the line, dams 29 and 30 of high temperature resistant, insulating material may be held against the sides of the part 1, as illustrated in FIG. 11, to hold the molten metal in place. Of course, such dams 29 and 30 may be used with a slab 28 or be extensions of the latter.

Because the heating and cooling of the metal is very rapid with the methods of the invention, normally, there will be very little oxidation of the heated metal. However, in all of the embodiments disclosed herein, the methods may be carried out with the metal being heated in an inert atmosphere, such as an atmosphere of argon or nitrogen, if the metal being heated would be adversely affected by air. Thus, the method may be carried out with an inert gas directed on the metal being heated or in a closed chamber containing the inert gas.

In the methods of the invention, the heating is always such that if the metal along the path 2 is merely allowed to cool when the current is turned off, such metal will be self-quenched. However, it is possible to cool the metal adjacent the path 2 while the current is flowing in the path 2 by means of a cooling medium. Furthermore, a cooling medium can be applied to the metal along path 2 after the current is discontinued to assist in the rapid cooling of such metal. If desired, self-quenching may be improved by chilling the metal part before applying the heating current.

FIGS. 12 and **12*a* illustrate a preferred embodiment of the invention used for the hardening of a seat for a valve of an internal combustion engine, and FIG. 13 illustrates the hardened lines obtained with the apparatus shown in FIGS. 12 and 12*a***.

In the embodiment of FIGS. 12 and **12*a* the lead 31, connected to a high frequency source and which does not touch the valve seat metal is connected through a pair of arcuate proximity conductors 32 and 33 to a contact 34 which engages the land 35 around the valve seat 36. A second contact 37 engages a portion of the land 35 which is diametrically opposite to the portion thereof engaged by the contact 34 and is connected to the high frequency source. The proximity conductors 32 and 33 are hollow and may be made form copper tubing, and the lead 31 and the contact 35 have passageways 38 and 39 which communicate with the interiors of the conductors 32 and 33 for the passage of cooling water. The contact 37 has a passageway 40 which communicates with the tube 41** for the passage of cooling water.

When current flows in the apparatus shown in FIG. 12, it flows to and from the lead 31 by way of both proximity conductors 32 and 33, the contact 34, the surface of the seat 36 and the contact 37. At the surface of the seat 36 the principal current flow is beneath the conductors 32 and 33 and is indicated by the dotted lines 42 and 43. Using the principles of the invention described hereinbefore, the seat 36 may be hardened along the lines 44 and 45 indicated in FIG. 13.

If desired, the contacts 34 and 37 may be arranged to contact the wall 46 below the seat 36, rather than the land 35, as indicated in FIG. 14, the hardening lines on the seat 36 being similar to those shown in FIG. 13.

If it is preferred to produce radial lines of hardened metal on the valve seat 36, rather than the circumferentially extending lines 44 and 45 shown in FIG. 13, the apparatus illustrated in FIGS. 15–17 may be employed.

The apparatus shown in FIGS. 15–17 comprises a pair of coaxial leads 47 and 48 connected to a high frequency source and preferably, having a length at least three times the external diameter of the lead 47 to provide better current distribution. The lead 47 has three contacts 49 formed integrally with its end, and the contacts 49 engage the land 35.

The inner lead 48 has a truncated conical surface 50 at its lower end which extends substantially parallel to the surface of the seat 36. A plurality of projections 51, equal in number to the number of contacts 49 and hardened lines to be produced, extend from the surface 50 toward the seat 36, such projections 51 acting as proximity conductors.

The lead 48 also carries an expandable collet 52 like a lathe collet, which may be expanded by a plug 53 carried by a rod 54 longitudinally movable in the directions of the double-ended arrow 55. When the collet 52 is expanded, it engages the wall 46, and the collet 52 forms the second set of contacts for causing current to flow at the surface of the seat 36.

Due to proximity and skin effects, the current will flow on the exterior surface of the lead 48 and will flow to and from such surface primarily on the outer surfaces of the projections 51, the collet 52, in paths at the surface of the seat underlying the projections 51, the contacts 49 and the lead 47. Thus, there are three current paths on the surface of the seat, the currents being in parallel.

Accordingly, using the principles described hereinbefore, the seat 36 will be hardened along the lines 56 indicated at FIG. 18 with the apparatus shown in FIGS. 15–17. The number of lines of hardened metal may, of course, be increased or decreased by changing the number of contacts 49 and the number of projections 51. The major current flow paths are determined by the projections 51 so that it is not necessary that the number of the contacts 49 be the same as the number of projections 51, and in fact, the contacts 49 may be eliminated altogether so that the circular end face of the lead 47 bears against the land 35.

The principles described in connection with FIGS. 15–18 may be employed to harden the wall of a hole in a part made of a hardenable metal, either the entire wall or along selected areas thereof.

FIG. 19 illustrates a part 60 of hardenable metal having a through-hole 61 with a wall 62 extending therearound. High frequency electric current is caused to flow on the wall 62 by means of a conductor 63 which acts as a proximity conductor and which is connected at one end to a high frequency source and at its opposite end to a plate 64. The plate 64 contacts the underside 65 of the part 60, and a tube 66, connected to the high frequency source, is co-axial with the conductor 63 and contacts the upper side 67 of the part 60. The current flows as indicated by the dotted lines 68 and 69, the current, however, being uniformly distributed over the surface of the conductor 63 of the wall 62 if the surface of the conductor 63 is co-axial with the wall 62. The current is caused to flow in a magnitude and for the time required to heat the wall 62 to the temperature required to transform the metal at the surface of the wall 62 and is then discontinued. A thin layer of metal at the surface is so heated, and then, it is allowed to self-quench.

If only a line or lines of hardened metal are desired on the wall 62, the conductor 63 may be shaped, as shown in FIGS. 20 and 21, or have projections thereon as shown in FIGS. 22 and 23, to concentrate the heating current, and hence, the hardening along a line or lines. Thus, with the elliptical conductor **63*a* shown in FIG. 20, the current will be concentrated along the axially extending, shaded areas 70 and 71, and with the triangular shaped conductor 63*b*, the current will be concentrated along the axially extending shaded area 72, 73 and 74. Of course, conductor 63** may have other sectional shapes to provide a different number of lines of hardened metal.

Results similar to those obtained with the elliptical conductor **63*a* shown in FIG. 20, may be obtained with a conductor 63*c*, shown in FIG. 22 and having projections 75 and 76 on a cylindrical conductor 77**.

A spiral line of hardened metal may be provided by using a conductor **63*d* having a spiral projection 78 thereon as shown in FIG. 23**.

It may be found that when the contacts are placed at the edges of a metal part, such as in the embodiments shown in FIGS. 4–11, the metal at the edges melts and falls or moves away from the edges or there is excess melting or overheating of the metal at the edges due to the position of the edges and the fact that the edge metal is not surrounded by cooler metal. The tendency to fall away may be offset by the use of the dams 29 and 30 described in connection with FIG. 11. However, the current will still be relatively concentrated at the edges and may melt metal below the dams 29 and 30 or the metal at the edges may be heated to a temperature higher than the temperature of the remaining molten metal or there may still be excessive melting at the edges which may be undesirable.

To reduce the heating at the edges, the contacts, such as the contacts 15, 17 and **15*a* may be formed with two contacting surfaces as illustrated in FIG. 24. As shown therein, the contact 80, which may be connected to the conductor 14 or the conductor 19, or similar contacts 80 may be used for both the contacts 15 or 15*a* and 17, has a pair of surfaces 81 and 82 with contact and supply current to the part 1. The surfaces are spaced by a groove 83, and current flows from the surfaces 81 and 82 along two paths 84 and 84*a* before joining in a single path 85. Thus, the current is not as concentrated at the edge of the part 1 as it is along the path 85. The spacing between the surfaces 81 and 82** depends upon the operating conditions and the results desired but may, for example, be of the order of one-sixteenth inch.

Of course, if melting or overheating occurs too close to the contacts in the other embodiments of the invention, the contacts may be provided with a pair of spaced contacting surfaces as illustrated in FIG. 24.

It will be observed that in the embodiments described herein, the path of the major heating current is surrounded on three sides by metal which is heated relatively little by the current. Thus, the metal adjacent to the path is relatively cool, and when the current is discontinued, the metal in the path will cool rapidly, by conduction of heat to metal on three sides thereof. The temperature to which the adjacent metal can be heated without preventing self-quenching depends upon the metal of the part, its mass and configuration, and the current magnitude and time of heating, without preventing self-quenching, is determined by test. It is not necessary that the metal being heated be surrounded on three sides provided that it is heated very rapidly and before the adjacent metal rises significantly in temperature, and such rapid heating requires large current magnitudes and power, e.g. at least 20 $Kw/cm^2$, as compared with prior art methods using the apparatus described herein.

Although preferred embodiments of the present invention have been described and illustrated, it will be apparent to those skilled in the art that various modifications may be made without departing from the principles of the invention.

What is claimed is:

1. A method of modifying the properties of an area of the surface of a metal part along a path thereon which is narrow relative to its length and which is narrower than the surface so that there is metal of different properties at at least one lateral side thereof, said part being made of structurally continuous metal which changes its properties with heating to a transformation temperature and subsequent cooling, said method comprising:

contacting said metal part with a first contact means at one end of said path and with a second contact means at the opposite end of said path thereby to define the length of said path;

rapidly heating the metal of said path to a temperature at least equal to said transformation temperature by supplying electrical current having a frequency of at least 3000 Hz to both said contact means, and hence, to said metal part, said current being supplied to at lest one of said contact means through relatively long and narrow proximity conductor means which overlies at least most of the length of said path between said contact means, which is spaced from the surface of said path by not more than two times the width of said proximity conductor means in the direction substantially parallel to the surface of said path and perpendicular to said length of said path, and which is connected to said contact means so that the current therein, at any instant, flows oppositely to the flow of current in said metal part to cause the current to concentrate in a said path as close as possible to said conductor, the duration, frequency and magnitude of said current and said width of said proximity conductor means being selected to heat metal in a said path narrower than said surface to at least to said temperature to which it is to be heated prior to the time that the metal adjacent at said side of said path reaches a temperature which will prevent self-quenching of the metal of said path when the current is discontinued; and discontinuing the supply of said current to said path when at least said transformation temperature is reached and before said temperature which will prevent self-quenching is reached whereby the metal of said path is rapidly cooled and an area conforming to the surface of said path and at the surface of said metal part having surface properties different from metal adjacent thereto is formed.

2. A method as set forth in claim 1 wherein said proximity conductor means comprises a pair of conductors and wherein said pair of conductors are positioned so that, together, they overlie substantially the full length of said area and one of said conductors is connected to said first contact means and the other of said conductors is connected to said second contact means.

3. A method as set forth in claim 1 wherein said proximity conductor means is a single conductor connected to said first contact and is positioned to overlie the full length of said area.

4. A method as set forth in claim 1 further comprising reducing the heating of the metal adjacent at least one of said contact means by supplying said current to said part through a pair of spaced surfaces on said last-mentioned one contact means engaging said part at an end of said path so that the current follows a pair of paths adjacent said last-mentioned one contact means.

5. A method as set forth in claim 1 further comprising confining the metal of said path as the current flows therein by placing a bar of insulating material thereon and intermediate said conductor and said path.

6. A method as set forth in claim 1 wherein said current has a frequency of at least 50 KHz, the duration of said current is less than one second, the magnitude of said current is such as to produce a power density of at least 20 kilowatts per square centimeter and the width of said proximity conductor is less than one-half inch.

7. A method as set forth in claim 1 wherein said metal part has a hole therethrough and said area is on the wall of said hole and wherein said first contact means is positioned to engage said part at one end of said hole, said second contact means is positioned to engage said part at the opposite end of said hole and said proximity conductor means is a conductor connected to one of said contact means and positioned adjacent said wall and nearer one side of the wall than the opposite side thereof, said conductor extending from adjacet said one end of said hole to adjacent the other end thereof and having a width adjacent said wall which is small relative to the circumference of said wall.

8. A method as set forth in claim 1 further comprising varying the magnitude of said current during the heating of said metal of said path.

9. A method as set forth in claim 1 wherein said part has a circular surface extending around a central axis, said surface, when extended radially inwardly, intersecting said axis at an angle, wherein and said path is on said circular surface and wherein said proximity conductor means comprises a plurality of spaced conductors positioned to overlie said circular surface.

10. A method as set forth in claim 9 wherein said first contact means and said second contact means are positioned to engage said part at or adjacent said circular surface at points thereon which are diametrically opposite and the current is supplied to one of said contact means through a pair of spaced semi-circular proximity conductors overlying said circular surface.

11. A method as set forth in claim 9 wherein said first contact means is positioned to engage said part at or adjacent the outer periphery of said circular surface, said second contact means is positioned to engage said part at or adjacent the inner periphery of said circular surface and the current is supplied to said second contact means through a plurality of proximity conductors extending radially of said circular surface and overlying said circular surface.

12. A method as set forth in claim 1 wherein the temperature to which the metal of said path is heated is in the hardening temperature range for the metal of said part whereby the metal of said path is hardened.

13. A method as set forth in claim 1 wherein said metal of said path is heated at least to its melting temperature.

14. A method as set forth in claim 1, 12 or 13 further comprising producing relative movement between said part, on the one hand, and the contact means and said proximity conductor means, on the other hand, in a direction transverse to the length of the path, when the metal in said path has reached transformation temperature thereby to change the current concentration path to another similar narrow path at one side of the first-mentioned path and to reduce the current in such first-mentioned path to permit the metal of the latter path to rapidly cool and self-quench and when the metal in said first-mentioned path is quenched, successively similar heating and cooling the metal in the other path while preventing reheating of the metal in the first-mentioned path to said transformation temperature thereby to provide a plurality of side-by-side areas of metal each corresponding to a said path and having modified surface properties by reason of individual heating and cooling of the metal in the paths.

15. A method as set forth in claim 14 wherein said part is moved step-wise in said direction and said current is discontinued before each step.

16. A method as set forth in claim 14 wherein said part is moved continuously in said direction and said current is interrupted as the metal of said path reaches said temperature to which it is to be heated.

17. A method as set forth in claim 14 wherein said current is supplied to said contact means continuously and said part is moved in said direction as the metal of said path reaches said temperature to which it is to be heated, whereby the supply of current to said first-mentioned path is interrupted and is transferred to said other path.

18. A method of providing a helically shaped area of metal on the wall of a hole in a metal part, which area of metal has surface properties different from the adjacent metal, by modifying the properties of an area on the surface of said wall, said metal part being made of metal which changes it properties with heating to a transformation temperature and subsequent cooling, said method comprising:

contacting said metal part with a first contact means at one end of said hole and with a second contact means at the opposite end of said hole thereby to define the length of said area;

rapidly heating the metal of said area to a temperature at least equal to said transformation temperature by supplying electrical current having a frequency of at least 3000 Hz to both said contact means, and hence, to said metal part, the current being supplied to one of said contact means through proximity conductor means which is within said hole and extends from one end of said hole to the other end of said hole, which is adjacent said wall and overlies at least most of the length of said area between said contact means, which is shaped so that a portion thereof extends helically around the axis of said hole, is closer to said wall that the remainder thereof and is spaced from the surface of said area by not more than two times the width of said proximity conductor means in the direction substantially parallel to the surface of said area and perpendicular to said length of said area and which is connected to said contact means so that the current therein, at any instant, flows oppositely to the flow of current in said metal part, the duration, frequency and magnitude of said current and said width of said proximity conductor being selected to heat said area to at least to said temperature to which it is to be heated prior to the time that the metal adjacent said area reaches a temperature which will prevent self-quenching of the metal of said area when the current is discontinued; and discontinuing the supply of said current to said area when at least said transformation temperature is reached and before said temperature which will prevent self-quenching is reached whereby the metal of said area is rapidly cooled and a helically shaped area of metal at the surface of said metal part having surface properties different from metal adjacent thereto is formed.

19. A method of providing spaced lengths of metal on the wall of a hole in a metal part which have surface properties different from the adjacent metal by modifying the properties of an area on the surface of said wall, said metal part being made of metal which changes its properties with heating to a transformation temperature and subsequent cooling, said method comprising:

contacting said metal part with a first contact means at one end of said hole and with a second contact means at the opposite end of said hole thereby to define the length of said area;

rapidly heating the metal of a length of metal in said area to a temperature at least equal to said transformation temperature, without heating metal at the surface of said wall which is circumferentially adjacent said length of metal to said transformation temperature, by varying the heating in the direction circumferentially of said hole, said heating being produced by supplying electric current having a frequency of at least 3000 Hz to both said contact means, and hence, to said metal part, the current being supplied to one of said contact means through proximity conductor means which is within said hole and extends from one end of said hole to the other end of said hole, which is adjacent said wall and overlies at least most of the length of said area between said first contact means and said second contact means, which is spaced from the surface of said area by not more than two times the width of said proximity conductor means in the direction substantially parallel to the surface of said area and perpendicular to said length of said area and which is connected to said contact means so that the current therein, at any instant, flows oppositely to the flow of current in said metal part, the duration, frequency and magnitude of said current and said width of said proximity conductor means being selected to heat said area to at least to said temperature to which it is to be heated prior to the time that the circumferentially adjacent metal in said area reaches a temperature which will prevent self-quenching of the metal of said area when the current is discontinued; and discontinuing the supply of said current to said length of metal when at least said transformation temperature is reached and before said temperature which will prevent self-quenching is reached whereby the metal of said length of metal is rapidly cooled and a length of metal at the surface of the wall of said hole having surface properties different from metal adjacent thereto is formed.

20. A method as set forth in claim 19 wherein the heating is varied by shaping said conductor so that portions thereof extending in the axial direction of said hole are closer to said wall than the remainder of said conductor.

21. A method of providing spaced lengths of metal having surface properties different from the adjacent metal by modifying the properties of an area of the surface of a metal part made of metal which changes its properties with heating to a transformation temperature and subsequent cooling, said method comprising:

contacting said metal part with a first contact means at one end of said area and with a second contact means at the opposite end of said area thereby to define the length of said area;

rapidly heating the metal of said area corresponding to the said spaced lengths of metal to a temperature at least equal to said transformation temperature without heating metal intermediate said lengths to said transformation temperature by varying the heating along the length of said area, said heating being produced by supplying electrical current having a frequency of at least 300 Hz to both said contact means, and hence, to said metal part, said current being supplied to at least one of the said contact means through proximity conductor means which overlies at least most of the length of said area between said contact means, which is spaced from the surface of said area by not more than two times the width of said proximity conductor means in the direction substantially parallel to the surface of said area and perpendicular to said length of said area and which is connected to said contact means so that the current therein, at any instant, flows oppositely to the flow of current in said metal part, the duration, frequency and magnitude of said current and said width of said proximity conductor means being selected to heat said lengths of metal in said area to at least to said temperature to which it is to be heated prior to the time that the metal adjacent said area reaches a temperature which will prevent self-quenching of the metal of said area when the current is discontinued; and discontinuing the supply of said current to said area when at least said transformation temperature is reached at said lengths of metal and before said temperature which will prevent self-quenching is reached whereby the metal of said area is rapidly cooled and said spaced lengths of metal at the surface of said metal part having surface properties different from metal adjacent thereto are formed.

22. A method as set forth in claim 21 wherein said heating is varied by varying the shape of said proximity conductor means which overlies said area.

23. A method as set forth in claim 21 wherein said heating is varied by placing metal having an electrical conductivity higher than the electrical conductivity of the metal of said part on and in contact with said metal intermediate the places where said lengths of metal are to be provided prior to supplying current to said area.

24. Apparatus for modifying the properties of an area of a circular surface on a metal part made of a metal which changes it properties with heating to a transformation temperature and subsequent cooling, said circular surface being a surface of revolution co-axial with a central axis, which extends in a circumferential direction around said central axis and which has a width dimension transverse to said circumferential direction, said apparatus comprising:

a source of electrical current having a frequency of at least 3000 Hz and of a magnitude sufficient to produce a power density of at least 20 $Kw/cm^2$ in said path.

a pair of contact means engageable with said part at spaced positions thereon, at or adjacent said circular surface; and conductors connecting said source to said contact means, one of said conductors connecting said source to one of said contact means and one or more of said conductors being relatively long and narrow and being a proximity conductor or conductors connecting said source to the other of said contact means and each proximity conductor being disposed with its length extending from adjacent one of said contact means to the other of said contact means, being co-axial with and spaced from said central axis, being disposed with its length extending in said circumferential direction and overlying, conforming to and being spaced from said surface by a distance not greater than two times the width of said proximity conductor, each said proximity conductor being connected between said source and said other contact means so that, at any instant the current flow therein is opposite to the current flow between said contact means.

25. Apparatus as set forth in claim 24 wherein said proximity conductors are a pair of spaced conductors which overlie said circular surface and which extend in semi-circles around said central axis.

26. Apparatus for modifying the properties of an area of a circular surface in a metal part made of a metal which changes its properties with heating to a transformation temperature and subsequent cooling, said circular surface being a surface of revolution co-axial with a central axis which extends in a circumferential direction around said central axis and which has a width dimension transverse to said circumferential direction, said apparatus comprising:

a source of electrical current having a frequency of at least 3000 Hz and of a magnitude sufficient to produce a power density of at least 20 $Kw/cm^2$ in said area;

a pair of contact means engageable with said part at spaced positions thereon, one at the radially outward side and one at the radially inward side, of the circular surface; and conductors cnnecting said source to said contact means, one of said conductors connecting said source to one of said contact means and one or more of said conductors being relatively long and narrow and being a proximity conductor or conductors connecting said source to the other of said contact means and each proximity conductor being disposed with its length extending from adjacent one of said contact means to the other of said contact means, being spaced from said axis, being disposed with its length extending transversely to the width dimension of said surface, having a face nearest said surface with a circumferential width which is small relative to the dimension of said surface in said circumferential direction and overlying, conforming to and being spaced from said surface by a distance not greater than two times the width of proximity conductor, each said proximity conductor being connected between said source and said other contact means so that, at any instant the current flow therein is opposite to the current flow between said contact means.

* * * * *

UNITED STATES PATENT AND TRADEMARK OFFICE
CERTIFICATE OF CORRECTION

PATENT NO. : 4,215,259
DATED : July 29, 1980
INVENTOR(S) : Wallace C. Rudd et al.

It is certified that error appears in the above—identified patent and that said Letters Patent is hereby corrected as shown below:

Column 10, line 40, "form" should read -- from --
Column 10, line 41, "35" should read -- 34 --
Column 11, line 53, after "63" insert -- and --
Column 13, line 21, "lest" should read -- least --
Column 14, line 20, "adjacet" should read -- adjacent --
Column 15, line 27, "it" should read -- its --
Column 15, line 46, "that" should read -- than --
Column 17, line 8, "300" should read -- 3000 --
Column 18, line 41, "cnnecting" should read -- connecting --

Signed and Sealed this

*Twenty-third* Day of *December 1980*

[SEAL]

*Attest:*

SIDNEY A. DIAMOND

*Attesting Officer* *Commissioner of Patents and Trademarks*